United States Patent
Schwarz

(10) Patent No.: US 7,974,880 B2
(45) Date of Patent: Jul. 5, 2011

(54) SYSTEM FOR UPDATING ADVERTISEMENT BIDS

(75) Inventor: Michael Schwarz, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 224 days.

(21) Appl. No.: 11/701,275

(22) Filed: Jan. 31, 2007

(65) Prior Publication Data
US 2008/0183675 A1 Jul. 31, 2008

(51) Int. Cl.
*G06Q 30/00* (2006.01)
(52) U.S. Cl. .......... 705/14.71; 705/14.69; 705/14.43; 705/14.42; 705/14.46; 705/14.1; 705/37
(58) Field of Classification Search ............ 705/37, 705/14.71, 14.69, 14.46, 14.43, 14, 14.1, 705/14.42
See application file for complete search history.

(56) References Cited

U.S. PATENT DOCUMENTS

| | | | | |
|---|---|---|---|---|
| 5,983,205 | A * | 11/1999 | Brams et al. | 705/37 |
| 7,043,450 | B2 * | 5/2006 | Velez et al. | 705/37 |
| 7,778,159 | B2 * | 8/2010 | Driscoll et al. | 370/217 |
| 2004/0088241 | A1 * | 5/2004 | Rebane et al. | 705/37 |
| 2005/0144065 | A1 * | 6/2005 | Calabria et al. | 705/14 |
| 2007/0038508 | A1 * | 2/2007 | Jain et al. | 705/14 |
| 2007/0124194 | A1 * | 5/2007 | Barnette et al. | 705/10 |
| 2007/0130004 | A1 * | 6/2007 | Borgs et al. | 705/14 |
| 2008/0103893 | A1 * | 5/2008 | Nagarajan et al. | 705/14 |
| 2008/0140489 | A1 * | 6/2008 | Berkhin et al. | 705/8 |

FOREIGN PATENT DOCUMENTS

DE 19913509 A1 * 9/1999
EP 1282051 A1 * 2/2003

OTHER PUBLICATIONS

Benjamin Edelman, Michael Ostrovsky, and Michael Schwarz, *Internet Advertising and the Generalized Second-Price Auction: Selling Billions of Dollars Worth of Keywords*, Aug. 1, 2006, pp. 1-25.

\* cited by examiner

*Primary Examiner* — Michael Bekerman
*Assistant Examiner* — Luis Brown
(74) *Attorney, Agent, or Firm* — Brinks Hofer Gilson & Lione

(57) ABSTRACT

A system for updating advertisement bids including a query engine and an advertisement selection engine. The query engine provides an advertisement query to the advertisement selection engine. The advertisement selection engine includes a query processing module that retrieves advertisements associated with the advertisement query based on bids. The bid update module generates a suggested bid for an advertiser. The bid update module may be configured to automatically update the current bid for an advertisement based on the suggested bid. Further, the bid update module may be configured to determine the suggested bid by calculating a maximum profit position for the advertisement and projecting an envy free point for the maximum profit position.

21 Claims, 2 Drawing Sheets

SYSTEM FOR UPDATING ADVERTISEMENT BIDS

BACKGROUND

Online search engines are often used to search the Internet for specific content that is of interest to the user. This is generally accomplished by entering keywords into a search field that relate to the specific interest of the user. Generally, the search engine would then try to match the entered keywords to web pages that contain the keywords or that have been associated with the keywords through some methodology. The user is then provided with a list of search results that are ranked in order with the most relevant search results at the top of the list and the least relevant search results at the bottom of the list. Generally, revenue for the search engines would be generated by advertisements that are placed on the page along with the search results. The user could select the advertisement and be redirected to a web page for the ad sponsor. However, certain advertisers may have a particular interest in displaying their advertisements with searches based on particular keywords that may indicate an interest in their product. Further, advertisements at the top of a list of advertisements are more likely to be selected by the user than the advertisements further down the list. Accordingly, a different value may be placed on the advertisement based on their position in the list.

There are three major stages in the development of sponsored search advertising. First, advertisements were sold manually and slowly in large batches, and on a cost per impression bases. Next, keyword-targeted per-click sales were implemented. This began to streamline advertisement sales with some self-serve bidding interfaces that facilitated an auction for ad placement, but these auctions resulted in a highly unstable first price mechanism. More recently, generalized second price auctions (GSP) were adopted. A GSP auction generally does not have an equilibrium in dominant strategies, and truth telling is typically not an equilibrium of GSP auctions. So advertisers must strategize in determining their bid. Therefore, the mechanism encourages inefficient investments in the bidding system. It can also create volatile prices that in turn cause allocative inefficiencies. Truth telling is an equilibrium when no one advertiser can benefit by changing their bid.

In the simplest GSP auction, advertisers submit bids and the ads are shown according to the bid amounts. In a more complex GSP auctions an ad can be assigned a score that is a function of bid, relevance, clicability, quality of the ad, advertiser volume, etc. Then the ads can be ordered based on scores. The key feature of GSP auction is that the payment of an advertiser in a particular position is generally lower than his bid; the payment is set to be equal the lowest bid sufficient for occupying that position. When a user enters the keyword, he receives search results along with sponsored links, where the sponsored links are shown in decreasing order of bids. In particular, the ad with the highest score is displayed at the top, the ad with the next highest score is displayed in the second position, and so on. If the user subsequently clicks on an ad in position k, the advertiser is charged by the search engine an amount equal to the next highest bid, for example the bid of an advertiser in the k+1 position, provided that all ads are of the same quality.

In view of the above, it is apparent that there exists a need for an improved system and method for updating bid advertisements.

SUMMARY

In satisfying the above need, as well as overcoming the drawbacks and other limitations of the related art, the present invention provides a system and method for updating advertiser bids.

The system includes a query engine, a text search engine, and an advertisement engine. The query engine receives a query from the user which is provided to the text search engine to perform a web page search. The query engine provides a advertisement query to the advertisement selection engine. The advertisement selection engine includes a query processing module that retrieves advertisements associated with the advertisement query and orders them in a list based on bids stored in a bid data base. The bid update module is in communication with the bid data base and generates a suggested bid for an advertiser. The bid update module may be configured to automatically update the current bid for an advertisement based on the suggested bid, for example at fixed time intervals. Further, the bid update module may be configured to determine the suggested bid by calculating a maximum profit position for the advertisement and projecting an envy free point for the maximum profit position.

The maximum profit position and the envy free point may be calculated based on a value per click provided by the advertiser and a cost per click associated with each position for an advertisement query. Further, the bid update module may be configured to automatically update the current bid based on the suggested bid according to a predetermined time interval, the advertisement query, or a change in the bid landscape.

The maximum profit position may be calculated based on a value per click provided by the advertiser and a cost per click associated with each position for an advertisement query. In addition, the envy free point may be calculated based on the value per click, the cost per click for the profit maximizing position, and the cost per click for a position just above the profit maximizing position. Further, the bid update module may be configured to automatically update the current bid based on the suggested bid according to a predetermined time interval, the advertisement query, or a change in the bid landscape.

Further objects, features and advantages of this invention will become readily apparent to persons skilled in the art after a review of the following description, with reference to the drawings and claims that are appended to and form a part of this specification.

DETAILED DESCRIPTION

Figure 1:
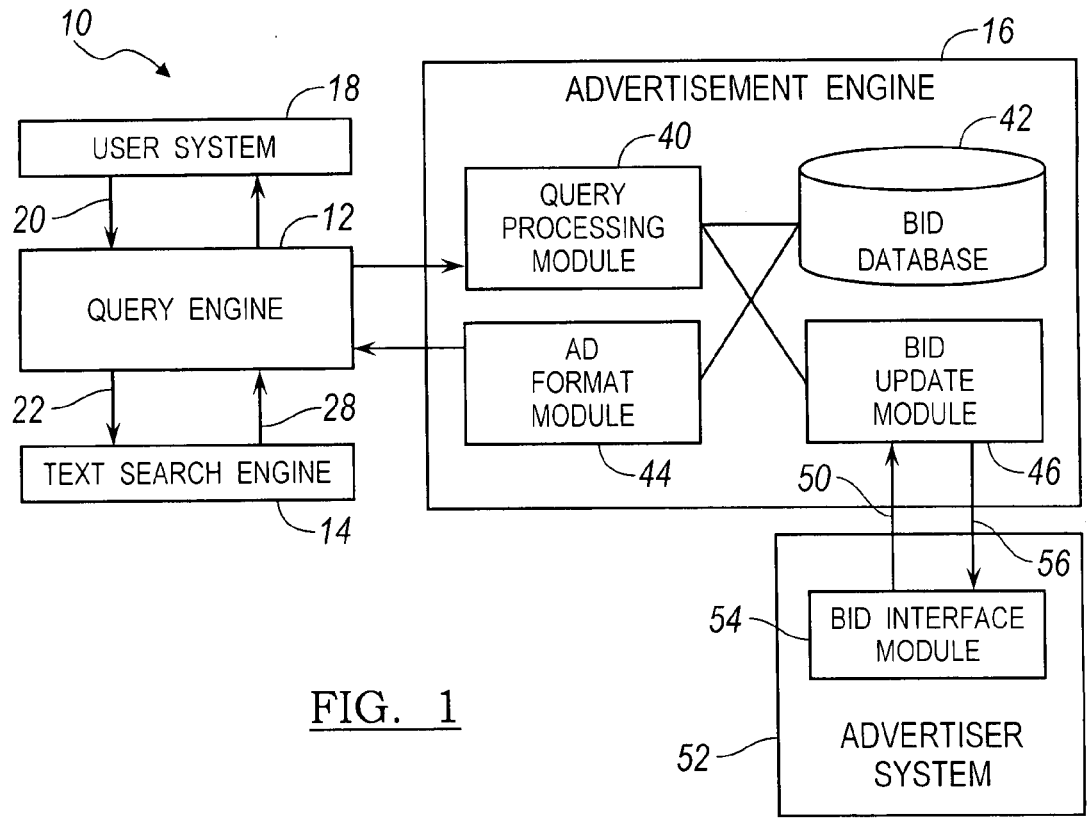
FIG. 1 is a schematic view of a system for generating an advertisement based on a query.

Referring now to FIG. 1, a system embodying the principles of the present invention is illustrated therein and designated at 10. The system 10 includes a query engine 12, a text search engine 14, and an advertisement engine 16. The query engine 12 is in communication with a user system 18 over a network connection, for example over an Internet connection. The query engine 12 is configured to receive a text query 20 to initiate a web page search. The text query 20 may be a simple text string including one or multiple keywords that identify the subject matter for which the user wishes to search. For example, the text query 20 may be entered into a text box. Upon selection of the search button, the text query 20 may be sent from the user system 18 to the query engine 12. The text query 20 also referred to as a raw user query, may be simply a list of terms known as keywords.

The query engine 12 provides the text query 20, to the text search engine 14. The text search engine 14 includes an index module and a data module. The text search engine 14 compares the keywords 22 to information in the index module to determine the correlation of each index entry relative to the keywords 22 provided from the query engine 12. The text search engine 14 then generates text search results by ordering the index entries into a list from the highest correlating entries to the lowest correlating entries. The text search engine 14 may then access data entries from the data module that correspond to each index entry in the list. Accordingly, the text search engine 14 may generate text search results 28 by merging the corresponding data entries with a list of index entries. The text search results 28 are then provided to the query engine 12 to be formatted and displayed to the user.

The query engine 12 is also in communication with the advertisement engine 16 allowing the query engine 12 to integrate, tightly or otherwise, advertisements with the user query and search results. To more effectively select appropriate advertisements that match the user's interest and query intent, the query engine 12 may be configured to further analyze the text query 20 and generate an advertisement query 30. The query intent may be better categorized by defining a number of domains that model typical search scenarios. Typical scenarios may include looking for a hotel room, searching for a plane flight, shopping for a product, or similar scenarios. Accordingly, a domain for the query may be identified and provided to the advertisement engine 16. Alternatively, simple keywords may also be provided as the advertisement query 30.

The advertisement query 30 is provided to the advertisement engine 16. The advertisement engine 16 includes a query processing module 40, a bid database 42, an ad format module 44, and a bid update module 46. The advertisement query 30 is received by the query processing module 40. The query processing module 40 accesses the bid database 42 to retrieve bid information associated with the advertisement query 30. The query processing module 40 determines the ad placement based on the bid information that relates each advertisement to the advertisement query 30. For example, the ads may be arranged in a list from the highest bid at the top of the list to the lowest bid at the bottom of the list. The query processing module 40 charges an advertiser account associated with each advertisement an award amount based on the auction format, the bid placed, and the ad placement. Various auction models may be implemented by the query processing module 40. For example, an English auction, a generalized second price auction (GSP), a Vickrey-Clarke-Groves auction (VCG), or any other type of auction.

The ad format module 44 may receive the ad placement information from the query processing module 40 and format a list of ads including integrating ad information from the bid database 42 or other databases. For example, metadata tags may be used to integrate ad information into the ad content based on the advertisement query 30, the date, or other information. Accordingly, the advertiser may provide targeted offers to users based on such information. The advertisement results 48 including the formatted advertisement list and customized ad content are provided back to the query engine 12.

The query engine 12 may format the advertisement results 36 and the search results 28 to be displayed to the user by the user system 18.

The bid update module 46 is in communication with the bid database 42 to update advertiser bid information, automatically or otherwise. In one example, the bid update module 46 automatically calculates and updates the suggested bid at a fixed time interval. Alternatively, the bid update module 46 may receive notification from the query processing module 40 to update the bid information in the bid database 42 based on the advertisement query 30. In yet another example, the bid update module 46 may calculate and update the bids for a particular keyword based on a change in a bid of another advertiser on the same keyword. The bid update module 46 is configured to calculate a suggested bid value for the advertiser. The advertiser may automatically accept the suggested bid, manually accept the suggested bid, or enter its own bid.

The bid update module 46 may calculate the suggested bid amount by (1) finding a position of the advertisement that maximizes profits to the advertiser, and (2) choosing an envy free point for the suggested bid in the bid landscape. Essentially, the envy free point for advertiser N is a bid level where advertiser N is indifferent between occupying its current advertisement position and being undercut by the smallest possible amount by an advertiser whose ad is displayed in an advertisement position above that of advertiser N. As such, the suggested bid may be based on the value that the advertiser assigns to clicks from a keyword, the total cost of clicks for the keyword, and the amount that the advertiser will have to pay to get a particular position for the keyword. If all advertisers used the suggested bid from the bid update module 46, the bid landscape may substantially stabilize.

To further describe calculation of the suggested bid, the following definitions are provided:

$V(N,I)$ is the value that the advertiser N assigns to clicks from an auction I related to a keyword or query.

$Q(N,I)$ is a vector that we will refer to as quality vector. It includes as its components attributes of advertiser N and of his ad for auction I such as clicability (denoted by $\gamma$, as well as a proxy for ad quality, proxies for user experience from the ad etc.)

$CTR(N,I,J)$ is a click through rate that advertiser N will get for the query associated with an auction I if the advertiser N were in position J. It is often useful to approximate $CTR(N,I,J)=CTR(N,J)* \gamma(N,I)$ where $\gamma$ is a clickability (part of quality vector) Note: If keyword level data regarding how fast CTR declines by position is unavailable, some aggregate rules of thumb can be used regarding the ratios in CTR by position.

$B(N,I)$ is the bid of an advertiser N for auction I and B is a vector of all bids for all advertisers.

Let $S(B(N,I),Q(N,I))$ denotes a function that maps an advertiser's bid and his quality into his score. (examples include a simple scoring function where score equals to the bid, a scoring function where score is a product of bid and some of the attributes of the ad such as clicability or a product of bid clicability and overall quality of the ad)

$C(N,I,J)$ is the lowest amount that advertiser N may bid to attain position J in auction I. For instance if all ads have the same attributes such as quality then $C(N,I,J)$ equals to the bid of J-th highest bidder (excluding the instant advertiser) plus one cent (or a minimum bid increment).

The GSP auctions are a class of auctions that are an industry standard for selling internet advertisement. In such auctions ads are arranged in order of scores (with the more desirable positions allocated to ads with higher scores). In a GSP auction the payment of each bidder is computed as the smallest amount that the bidder has to bid to maintain his position. More formally, denote the score of bidder in position J by S(J). Then in a GSP auction the bidder N who occupies position J will pay amount C(N,I,J) that solves the following equation $$S(C(N,I,J),Q(N,I))=S(J+1) \quad (1)$$

Note that if the scoring function is equal to the bid then the per click payment of advertiser in position J equals to the bid of advertiser in position J+1 (plus one cent if the bid increment is one cent).

β(N,I) denotes the envy free point of advertiser N for auction I.

To find the position of the advertisement that maximizes profit, the profit from each position is computed. In a simple GSP auction where all advertisments have the same quality, clicability, relevance, and advertiser scores, the advertiser will pay the bid of the advertiser in the position immediately below him. Therefore, the profit from being in position J is proportional to (V(N,I)−C(N,I,J))*CTR(N,I,J). The possible profit values are compared, and the position that leads to the highest profit is chosen. A range of bids can place the instant advertiser in position J. For J>1, an "envy free point" is chosen from the range of bids. In the simplest GSP auction described above, the envy free point is defined as following:

$$(V(N,I)-C(N,I,J))*CTR(N,I,J)=(V(N,I)-\beta(N,I))*CTR(N,I,J-1) \quad (2)$$

where the left hand side of the equation is the expected profit from being in the most profitable position and the right hand side of the equation is the expected profit for an unknown bid (the suggested bid) where the advertiser moves up one position and pays just below its own bid price. By setting these two equations equal the advertiser is setting its bid at a level where he would have at least the same or a better profit if he was under bid by the advertiser above him, hence an envy free point. Since the suggested bid is the only unknown in equation (2), the suggested bid can be solved for generating equation (3).

$$\beta(N,I)=V(N,I)-(V(N,I)-C(N,I,J))*CTR(N,I,J)/CTR(N,I,J-1) \quad (3)$$

C may be calculated based on the bids and quality of the advertisements according to equation (1). Then, the values V, C, and CTR may be substituted into equation (3). It may also be realized that each term of equation (3) may be scaled or offset to account for advertisement preferences because a particular advertisement receives more clicks, an advertiser attains a higher dollar volume of advertisements, or similar business scenarios. For J=1, (when the top position is targeted), the bid update module could suggest any amount sufficient to maintain position 1, for example the midpoint between the advertiser's true value per click and the minimum bid required to remain in position 1. Therefore, the suggested bid may be described by the following relationship for the first position is β(N,I)=(V(N,I)+B(N,I,1))/2. Alternatively, the bid update module may suggest the minimum bid required to retain position 1. Although, also the bid update module may be configured to suggest any number between the minimum bid required to retain position 1 and the advertiser's true value.

To enhance the ability of the advertiser to determine its bid amount, the bid update module 46 is in communication with a bid interface module 54 which may be located on the advertiser system 52. Accordingly, the bid interface module 54 allows the advertiser to enter the value that the advertiser places on each click from a key word. The bid interface module 54 may display the suggested bid and may allow the user to override the suggested bid. The bid interface module 54 may also allow the user to select an update time interval or, alternatively, select updating based on the advertisement query or the changing of a competitor's bid.

Figure 2:
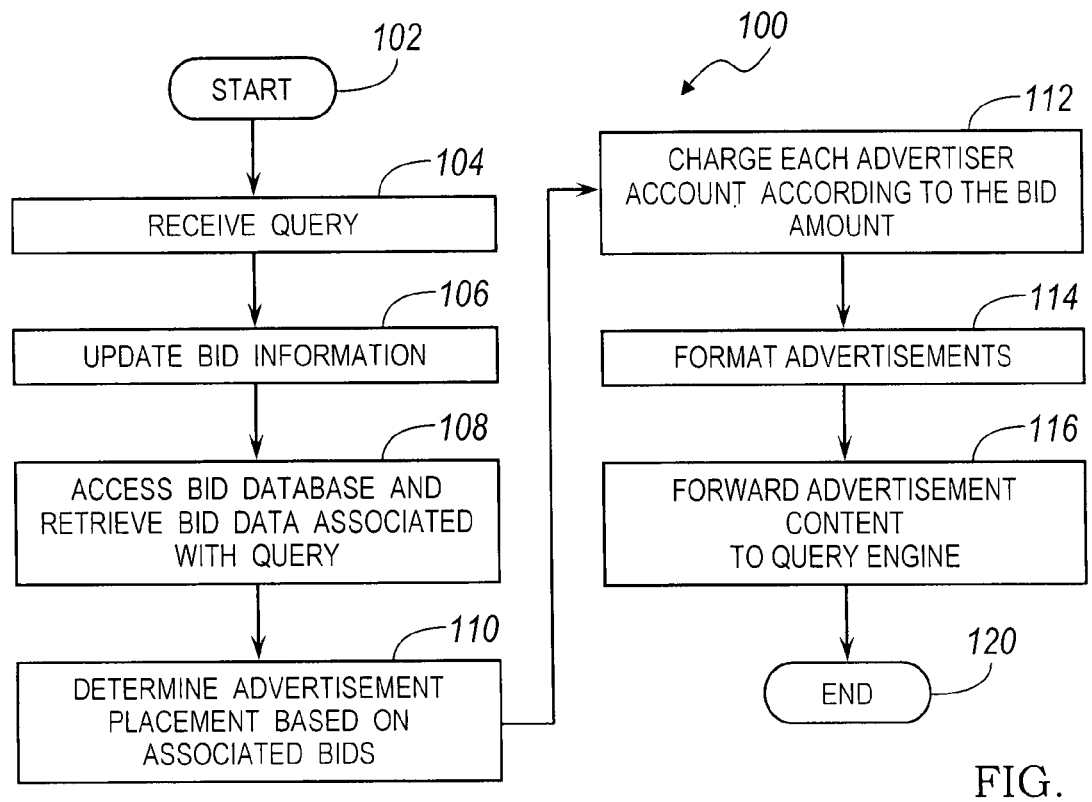
FIG. 2 is a flowchart of a process for generating advertisements.

Now referring to FIG. 2, a method 100 for generating advertisements is provided. The method 100 starts in block 102. An advertisement query is received as noted in block 104. In block 106, a bid update module 46 may be notified to update bids on keywords corresponding to the advertisement query 30. The bid database 42 is then accessed and the bid data is associated with the advertisement query 30 is retrieved, as noted in block 108. In block 110, the advertisement placement is determined for each advertisement based on the bid order. For example, the highest bid is placed at the top of the advertisement list, while the lowest bid is placed at the bottom of the advertisement list. In block 112, each advertiser account is charged according to the bids placed and the auction rules. For example, in a GSP auction the top bidder will pay an amount equal to a second-place bid, the second-place bidder will pay an amount equal to the third-place bid, and so on. The advertisements are formatted and the appropriate advertisement content is generated, as noted in block 114. As previously noted, advertisement content may be modified based on the advertisement query 30, the date, advertiser special offers, or other rules specified by the advertiser. In block 116, the advertisement content is forwarded to the query engine 12 for display to the user. The method ends in block 120.

Figure 3:
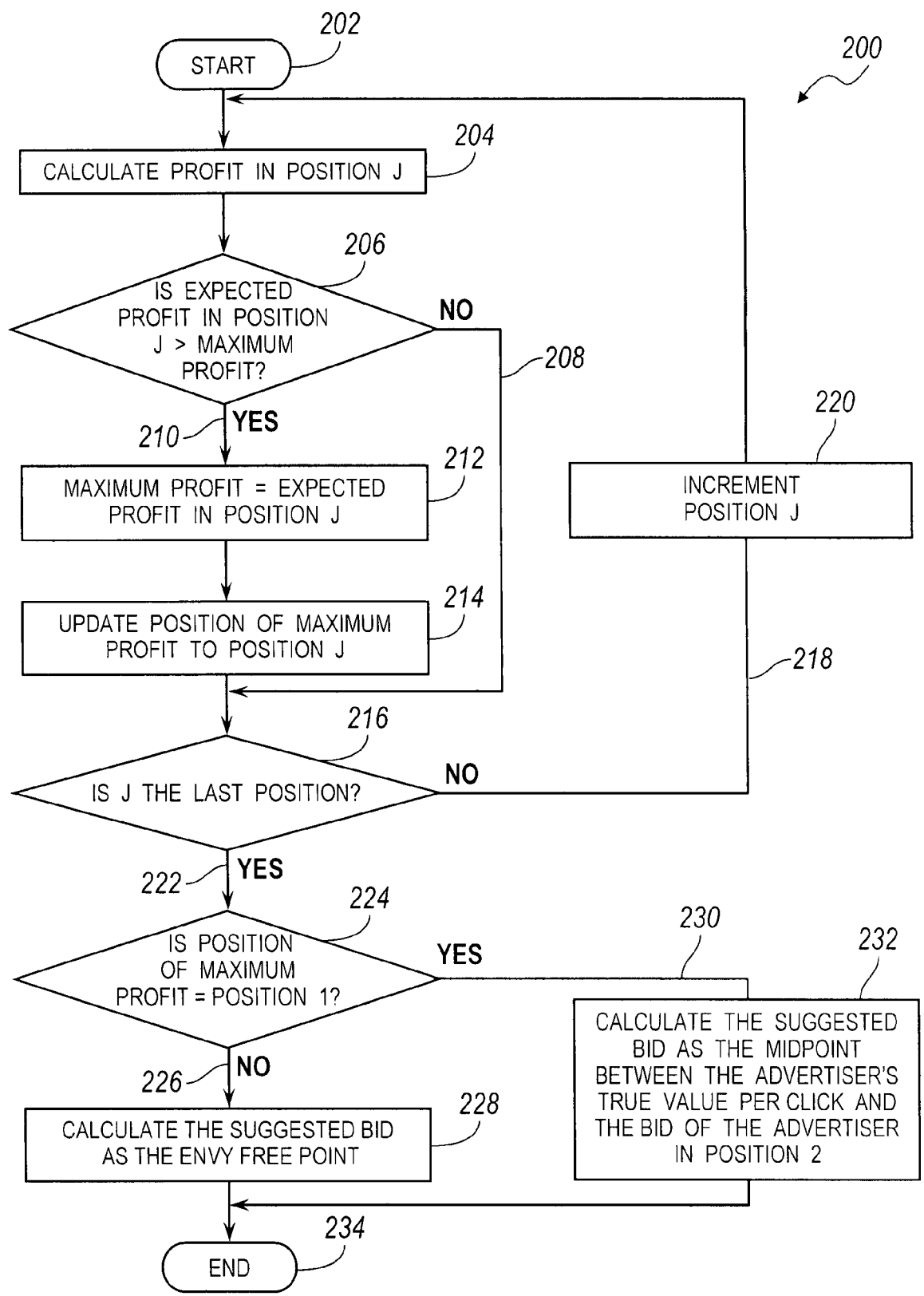
FIG. 3 is a flowchart of a process for updating bid information.

Now referring to FIG. 3, a method 200 for calculating a suggested bid starts in block 202. In block 204, the expected profit is calculated for the scenario where the advertiser is in position J starting at position 1. The bid update module 46 then determines if the expected profit in position J is greater than the maximum profit. As denoted by block 206, for the first position the maximum profit will have been set to zero, therefore, the expected profit will be greater than the maximum profit for J equals 1. If the expected profit is greater than the maximum profit, the method 200 follows line 210 and the maximum profit is set equal to the expected profit, as denoted by block 212. In block 214, the bid update module 46 updates the position of maximum profit to be equal to J. If the expected profit is not greater than the maximum profit, the method 200 follows line 208, to block 216. In block 216, the bid update module 46 determines if the current position J is the last position as determined by the number of bids associated with the advertisement query 30 or a maximum number of positions available. If the current position J is not the last position, the method 200 follows line 218 to block 220. In block 220, the current position J is incremented and the method 200 advances to block 204. Alternatively, if the current position J is the last position, the method 200 follows line 222 to block 224.

In block 224, the bid update module determines if the position of maximum profit is equal to position 1. If the position of maximum profit is not equal to position 1, the method 200 follows line 226 to block 228. In block 228, the bid update module 46 calculates the suggested bid as the envy free point for the position of maximum profit. Alternatively, if the position of maximum profit is equal to position 1, the method 200 follows line 230 to block 232. In block 232, the bid update module calculates the suggested bid as the midpoint between the advertiser's true value per click and the minimum bid that allows the advertiser to retain position 1 (just above the bid of the advertiser in position 2 in the simplest GSP auction). The method ends in block 232, however, as discussed above the method 200 may be repeated to automatically update and enter the suggested bid as the current bid for the advertiser according to various strategies including based on advertisement query, a time interval, and with a changing of the bid landscape.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

I claim:

1. A system for updating a bid for an advertisement of an advertiser, the system comprising:
   at least one computer comprising:
      a query engine configured to receive a query from a user, the query engine being configured to request a text search based on the query; and
      an advertisement engine in communication with the query engine and configured to receive an advertisement query, the advertisement engine comprising
         a query processing module configured to select an advertisement position for the advertisement based on a bid stored in a bid database;
         a bid update module configured generate a suggested bid and automatically update a current bid in the bid database based on the suggested bid, wherein the bid update module is configured to determine a maximum profit position for the advertisement and generate the suggested bid based on an envy free point for the maximum profit position, wherein the bid update module is configured to determine the envy free point based on a value per click, a cost per click for the maximum profit position and a click through rate for the profit maximizing the maximum profit position, where the envy free point is a level where the advertiser would have at least a same or better profit if the bid were underbid by another advertiser in a position above the maximum profit position;
         wherein the envy free point is calculated based on a first difference between the value per click and a quantity, where the quantity includes a second difference between the value per click and the cost per click for the maximum profit position where the second difference is multiplied by a ratio of the click through rate for the maximum profit position to a click through rate for a position directly above the maximum profit position.

2. The system according to claim 1, wherein the bid update module is configured to calculate the maximum profit position based on a value per click, a cost per click, and a click through rate for each position.

3. The system according to claim 2, wherein the bid update module is configured to calculate a maximum profit position based on a relationship $P(N,I,J)=(V(N,I)-C(N,I,J))*CTR(N,I,J)$ where:
   $P(N,I,J)$ is the profit for advertiser N in position J of auction I;
   $V(N,I)$ is the value that the advertiser N assigns to clicks from auction I;
   $C(N,I,J)$ is the amount that the advertiser N will have to pay to get position J for auction I; and
   $CTR(N,I,J)$ is a click through rate that advertiser N will get in an auction I if the advertiser N were in position J.

4. The system according to claim 1, wherein the bid update module is configured to update the current bid for the advertisement based on a predetermined time interval.

5. The system according to claim 1, wherein the bid update module is configured to update the current bid for the advertisement based on the advertisement query.

6. The system according to claim 1, wherein the bid update module is configured to update the current bid for the advertisement based on a bid change from another advertiser.

7. A system for updating a bid for an advertisement of an advertiser, the system comprising:
   at least one computer comprising:
      a query engine configured to receive a query from a user, the query engine being configured to request a text search based on the query; and
      an advertisement engine in communication with the query engine and configured to receive an advertisement query, the advertisement engine comprising
         a query processing module configured to select an advertisement position for the advertisement based on a bid stored in a bid database;
         a bid update module configured generate a suggested bid and automatically update a current bid in the bid database based on the suggested bid, wherein the bid update module is configured to determine a maximum profit position for the advertisement and generate the suggested bid based on an envy free point for the maximum profit position, wherein the bid update module is configured to determine the envy free point based on a value per click, a cost per click for the maximum profit position and a click through rate for the profit maximizing the maximum profit position, where the envy free point is a level where the advertiser would have at least a same or better profit if the bid were underbid by another advertiser in a position above the maximum profit position;

wherein the bid update module is configured to determine the envy free point based on a relationship $\beta(N,I)=V(N,I)-(V(N,I)-C(N,I,J))*CTR(N,I,J)/CTR(N,I,J-1)$ where:

$\beta(N,I)$ denotes the envy free point for advertiser N on auction I;

V(N,I) is the value that the advertiser N assigns to clicks from auction I;

C(N,I,J) is the amount that the advertiser N will have to pay to get position J for auction I; and CTR(N,I,J) is a click through rate that advertiser N will get in an auction I if the advertiser N were in position J.

8. A method for updating bids for an advertisement of an advertiser, the method comprising:

receiving a value per click from the advertiser associated with an advertisement query;

determining a cost per click associated with each position for the advertisement query;

calculating a maximum profit position based on the value per click and the cost per click;

determining an envy free point in the maximum profit position, the envy free point being determined by a computer system;

determining a suggested bid based on the envy free point, wherein the envy free point is based on the value per click, the cost per click, and a click through rate for the maximum profit position, where the envy free point is a level where the advertiser would have at least a same or better profit if the bid were underbid by another advertiser in a position above the maximum profit position; and updating a current bid for the advertisement based on the suggested bid;

wherein the envy free point is calculated based on a first difference between the value per click and a quantity, where the quantity includes a second difference between the value per click and the cost per click for the maximum profit position where the second difference is multiplied by a ratio of the click through rate for the maximum profit position to a click through rate for a position directly above the maximum profit position.

9. The method according to claim 8, wherein calculating a maximum profit position is based on the value per click, the cost per click, and a click through rate for each position.

10. The method according to claim 9, wherein calculating a maximum profit position is based on a relationship $P(N,I,J)=(V(N,I)-C(N,I,J))*CTR(N,I,J)$ where:

P(N,I,J) is the profit for advertiser N in position J of auction I;

V(N,I) is the value that the advertiser N assigns to clicks from auction I;

C(N,I,J) is the amount that the advertiser N will have to pay to get position J for auction I; and CTR(N,I,J) is a click through rate that advertiser N will get in an auction I if the advertiser N were in position J.

11. The method according to claim 8, wherein updating the current bid for the advertisement is based on a predetermined time interval.

12. The method according to claim 8, wherein updating the current bid for the advertisement is based on the advertisement query.

13. The method according to claim 8, wherein updating the current bid for the advertisement is based on a bid change from another advertiser.

14. A method for updating bids for an advertisement of an advertiser, the method comprising:

receiving a value per click from the advertiser associated with an advertisement query;

determining a cost per click associated with each position for the advertisement query;

calculating a maximum profit position based on the value per click and the cost per click;

determining an envy free point in the maximum profit position, the envy free point being determined by a computer system;

determining a suggested bid based on the envy free point, wherein the envy free point is based on the value per click, the cost per click, and a click through rate for the maximum profit position, where the envy free point is a level where the advertiser would have at least a same or better profit if the bid were underbid by another advertiser in a position above the maximum profit position;

updating a current bid for the advertisement based on the suggested bid;

wherein determining an envy free point is based on a relationship $\beta(N,I)=V(N,I)-(V(N,I)-C(N,I,J))*CTR(N,I,J)/CTR(N,I,J-1)$ where:

$\beta(N,I)$ denotes the envy free point for advertiser N on auction I;

V(N,I) is the value that the advertiser N assigns to clicks from auction I;

C(N,I,J) is the amount that the advertiser N will have to pay to get position J for auction I; and CTR(N,I,J) is a click through rate that advertiser N will get in an auction I if the advertiser N were in position J.

15. In a computer readable storage medium having stored therein instructions executable by a programmed processor for updating bids for an advertisement, the storage medium comprising instructions for:

receiving a value per click from the advertiser associated with the advertisement query;

determining a cost per click associated for each position associated with the advertisement query;

calculating a maximum profit position based on the base on the value per click and the cost per click;

determining an envy free point in the maximum profit position, wherein the envy free point is based on the value per click, the cost per click, and a click through rate for the maximum profit position, where the envy free point is a level where the advertiser would have at least a same or better profit if the bid were underbid by another advertiser in a position above the maximum profit position;

determining a suggested bid based on the envy free point; and updating a current bid for the advertisement based on the suggested bid;

wherein the envy free point is calculated based on a first difference between the value per click and a quantity, where the quantity includes a second difference between the value per click and the cost per click for the maximum profit position where the second difference is multiplied by a ratio of the click through rate for the maximum profit position to a click through rate for a position directly above the maximum profit position.

16. The computer readable storage medium according to claim 15, wherein calculating a maximum profit position is based the value per click, the cost per click, and a click through rate for each position.

17. The computer readable storage medium according to claim 16, wherein calculating a maximum profit position is based on a relationship $P(N,I,J)=(V(N,I)-C(N,I,J))*CTR(N,I,J)$ where:

P(N,I,J) is the profit for advertiser N in position J of auction I;

V(N,I) is the value that the advertiser N assigns to clicks from keyword labeled;

C(N,I,J) is the amount that the advertiser N will have to pay to get position J for auction I; and CTR(N,I,J) is a click through rate that advertiser N will get in an auction I if the advertiser N were in position J.

18. The computer readable storage medium according to claim 15, wherein updating the current bid for the advertisement is based on a predetermined time interval.

19. The computer readable storage medium according to claim 15, wherein updating the current bid for the advertisement is based on the advertisement query.

20. The computer readable storage medium according to claim 15, wherein updating the current bid for the advertisement is based on a bid change from another advertiser.

21. In a computer readable storage medium having stored therein instructions executable by a programmed processor for updating bids for an advertisement, the storage medium comprising instructions for:

receiving a value per click from the advertiser associated with the advertisement query;

determining a cost per click associated for each position associated with the advertisement query;

calculating a maximum profit position based on the base on the value per click and the cost per click;

determining an envy free point in the maximum profit position, wherein the envy free point is based on the value per click, the cost per click, and a click through rate for the maximum profit position, where the envy free point is a level where the advertiser would have at least a same or better profit if the bid were underbid by another advertiser in a position above the maximum profit position;

determining a suggested bid based on the envy free point;

updating a current bid for the advertisement based on the suggested bid;

wherein determining an envy free point is based on a relationship $\beta(N,I)=V(N,I)-(V(N,I)-C(N,I,J))*CTR(N,I,J)/CTR(N,I,J-1)$ where:

$\beta(N,I)$ denotes the envy free point for advertiser N on auction I;

V(N,I) is the value that the advertiser N assigns to clicks from keyword labeled;

C(N,I,J) is the amount that the advertiser N will have to pay to get position J for auction I; and CTR(N,I,J) is a click through rate that advertiser N will get in an auction I if the advertiser N were in position J.

\* \* \* \* \*